(12) United States Patent
Hou et al.

(10) Patent No.: US 8,797,495 B2
(45) Date of Patent: Aug. 5, 2014

(54) LCD PANEL AND METHOD OF FORMING THE SAME

(75) Inventors: Hung-lung Hou, Shenzhen (CN); Cheng-ming He, Shenzhen (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 83 days.

(21) Appl. No.: 13/380,044

(22) PCT Filed: Nov. 24, 2011

(86) PCT No.: PCT/CN2011/082875
§ 371 (c)(1),
(2), (4) Date: Dec. 22, 2011

(87) PCT Pub. No.: WO2013/060061
PCT Pub. Date: May 2, 2013

(65) Prior Publication Data
US 2013/0100385 A1  Apr. 25, 2013

(30) Foreign Application Priority Data
Oct. 25, 2011 (CN) .......................... 2011 1 0327418

(51) Int. Cl.
*G02F 1/1333* (2006.01)
*G02F 1/1339* (2006.01)
*G02F 1/1335* (2006.01)
*G02F 1/1343* (2006.01)

(52) U.S. Cl.
CPC ...... *G02F 1/13394* (2013.01); *G02F 1/133512* (2013.01); *G02F 1/134363* (2013.01)
USPC ........... 349/155; 349/156; 349/157; 349/110; 349/106

(58) Field of Classification Search
CPC .......... G02F 1/13394; G02F 1/133512; G02F 1/133514; G02F 1/134363
USPC .................................. 349/155–157, 110, 141
See application file for complete search history.

(56) References Cited

U.S. PATENT DOCUMENTS

| | | | |
|---|---|---|---|
| 5,644,373 A * | 7/1997 | Furushima et al. ............ | 349/158 |
| 2007/0002263 A1* | 1/2007 | Kim et al. ..................... | 349/156 |
| 2007/0069204 A1* | 3/2007 | Jang et al. ........................ | 257/40 |
| 2008/0266498 A1* | 10/2008 | Kim et al. ..................... | 349/110 |
| 2009/0231522 A1* | 9/2009 | Kim et al. ..................... | 349/106 |

* cited by examiner

*Primary Examiner* — Thanh-Nhan P Nguyen (57) ABSTRACT

An LCD panel and method for forming the same are proposed. The LCD panel includes a TFT substrate, an opposite substrate, and a liquid crystal LC layer sandwiched between the TFT substrate and the opposite substrate. The opposite substrate includes main spacers for sparing space between the TFT substrate and the opposite substrate and secondary spacers. The TFT substrate includes TFTs and color filters with recesses. The secondary spacers fit the recesses, and the secondary spacers do not touch the TFT substrate. Not only a thickness of the LCD panel is adjustable when the liquid crystal is injected between the TFT substrate and the opposite substrate, but also the optical characteristics of the LCD panel can not change to effect display quality when the LCD panel is squeezed by force.

5 Claims, 6 Drawing Sheets

LCD PANEL AND METHOD OF FORMING THE SAME

BACKGROUND OF THE INVENTION

1. Field of the Invention

The present invention relates to a liquid crystal display (LCD) panel and a method of forming the same, and more particularly, to an LCD panel comprising a plurality of mixed hybrid spacers and a method of forming the same.

2. Description of the Prior Art

Nowadays, light and thin flat display panels are widely used in current consumer electronic products. Liquid crystal displays (LCDs) which are colorful monitors with high resolution are widely used in various electronic products such as monitors for mobile phones, personal digital assistants (PDAs), digital cameras, laptop computers, and notebook computers.

A conventional LCD is formed by a color filter substrate, a thin film transistor array substrate, and a liquid crystal layer therebetween. Such LCD has less resolution, a lower aperture ratio, and a defect of misalignment between the color filter substrate and the thin film transistor array substrate.

Figure 1:
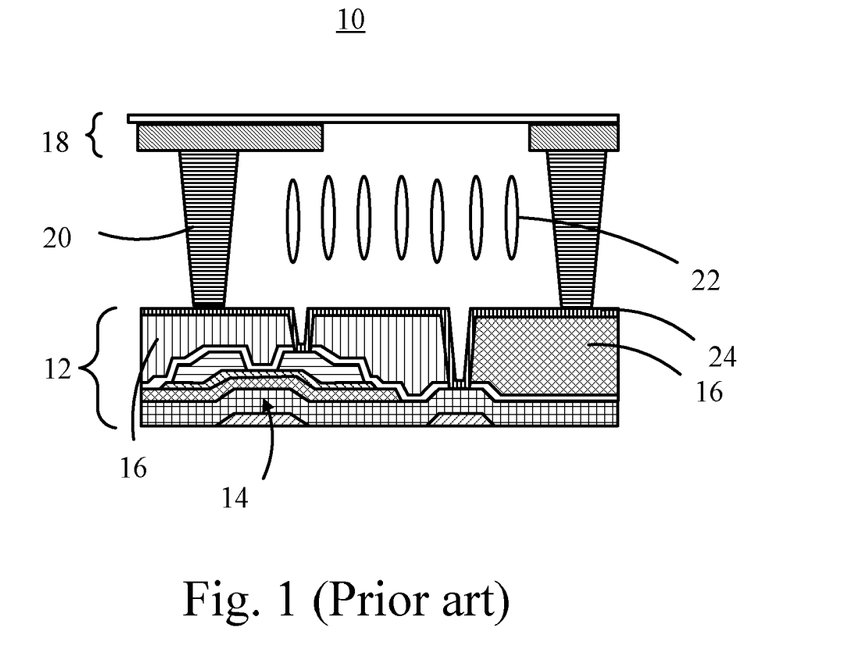
FIG. 1 is a diagram showing the structure of a traditional LCD panel comprising a color filter on array (COA) substrate.

Referring to FIG. 1, FIG. 1 is a diagram showing the structure of a traditional LCD panel 10 comprising a color filter on array (COA) substrate 12. The LCD panel 10 comprises the COA substrate 12 comprising a color filter 16 and a thin-film transistor (TFT) 14, an opposite substrate 18, a spacer 20, and an LC layer 22. The spacer 20 and the LC layer 22 are placed between the COA substrate 12 and the opposite substrate 18. The spacer 20 is used for sparing space between the COA substrate 12 and the opposite substrate 18. The color filter 16 is fabricated from at least one red color filter, one green color filter, and one blue color filter. The color filter 16 is directly formed on the TFT 14 so there are no alignment errors. Moreover, the capacitor between the COA substrate 12 and the opposite substrate 18 is small so a pixel electrode 24 can be extended outwards to increase the aperture ratio of the pixel.

However, the thickness of the color filter 16 is 3 um, causing the COA substrate 12 comprising the color filter 16 and the TFT 14 to be flattened. As a result, the spacer 20 on the opposite substrate 18 touches the color filter 16, making it difficult to control the thickness of the LC layer 22.

SUMMARY OF THE INVENTION

Therefore, an object of the present invention is to provide an LCD panel of controlling the thickness of the LC layer and a method of manufacturing the same for solving the problem occurring in the conventional technology. Because the thickness of the LC layer is controlled, the optical characteristics of the LCD panel do not change, which allows the LCD panel to show images normally.

According to the present invention, a liquid crystal display (LCD) panel, comprising a thin-film transistor (TFT) substrate, an opposite substrate, and a liquid crystal (LC) layer, the LC layer disposed in the gap between the TFT substrate and the opposite substrate, the opposite substrate comprising a plurality of main spacers and a plurality of secondary spacers, the plurality of main spacers used for sparing space between the TFT substrate and the opposite substrate. The TFT substrate comprises a plurality of TFTs, a plurality of color filters, disposed on the plurality of TFTs and comprising a plurality of recesses, and a plurality of pixel electrodes covering the plurality of color filters. Each of the plurality of pixel electrodes is electrically connected to the corresponding TFT. The plurality of secondary spacers fit the plurality of recesses, and the plurality of recesses do not touch the TFT substrate.

In one aspect of the present invention, the LCD panel further comprises a black matrix, and the plurality of main spacers and the plurality of secondary spacers are disposed on the black matrix.

In another aspect of the present invention, the TFT substrate comprises: a glass substrate, a plurality of scan lines, and a plurality of data lines. The plurality of scan lines and the plurality of data lines are disposed on the glass substrate. Each of the plurality of scan lines and each of the plurality of data lines are electrically connected to the corresponding TFT. The TFT substrate further comprises a passivation layer between the plurality of TFTs and the plurality of color filters.

In another aspect of the present invention, the pixel electrode comprises a a transparent electrode, a reflective electrode or a transflective electrode.

In another aspect of the present invention, each color filter is a red color filter, a green color filter, or a blue color filter.

According to the present invention, a method of manufacturing an LCD panel comprises providing a glass substrate; forming a TFT, a common electrode, a scan line, and a data line on the glass substrate; forming a passivation layer on the TFT; forming a color filter on the passivation layer; etching the color filter for forming a recess; forming a pixel electrode on the color filter and on the recess; forming an LC layer on the pixel electrode; covering an opposite substrate on the LC layer, the opposite substrate comprising a main spacer and a secondary spacer, the main spacer used for sparing space between the TFT substrate and the opposite substrate, the secondary spacer fitting the recess, and the secondary spacer not touching the TFT substrate.

In one aspect of the present invention, the steps of forming a TFT, a common electrode, a scan line, and a data line on the glass substrate comprise: forming a first metallic layer on the glass substrate; etching the first metallic layer for forming a gate of the TFT, the common electrode, and the scan line; forming an insulating layer on the gate of the TFT, the common electrode, and the scan line; forming a passage of the TFT on the insulating layer; and forming and etching a second metallic layer for forming a source and a drain of the TFT and the data line.

In one aspect of the present invention, before the step of forming a pixel electrode on the color filter and the recess, the method further comprises: etching the color filter and the passivation layer for forming a first via on the drain of the TFT and a second via on the common electrode.

In one aspect of the present invention, the method of forming the main spacer and the secondary spacer comprises a photo etching process (PEP) and an inkjet printing process.

In contrast to prior art, the LCD panel of the present invention comprising a plurality of mixed hybrid spacers has a better structural strength. The plurality of main spacers are used for sparing space between the COA substrate and the opposite substrate. The plurality of secondary spacers are used for sparing space between the COA substrate and the opposite substrate whenever the LCD panel is squeezed by force. In this way, the optical characteristics of the LCD panel will not change because of variations in the distance of the LC layer. Thus, the LCD panel can show images normally. In addition, the elasticity of the LC layer is increased when the LC layer is injected into the space between the opposite substrate and the COA substrate because a distance still exists between the plurality of secondary spacers and the COA substrate.

These and other features, aspects and advantages of the present disclosure will become understood with reference to the following description, appended claims and accompanying figures.

DETAILED DESCRIPTION OF THE PREFERRED EMBODIMENTS

Certain terms are used throughout the description and following claims to refer to particular components. As one skilled in the art will appreciate, electronic equipment manufacturers may refer to a component by different names. This documents does not intend to distinguish between components that differ in name but not function. In the following description and in the claims, the terms "include" and "comprise" are used in an open-ended fashion, and thus should be interpreted to mean "include, but not limited to . . . " Also, the term "electrically connect" is intended to mean either an indirect or direct electrical connection. Accordingly, if one device is coupled to another device, that connection may be through a direct electrical connection, or through an indirect electrical connection via other devices and connections.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 2:
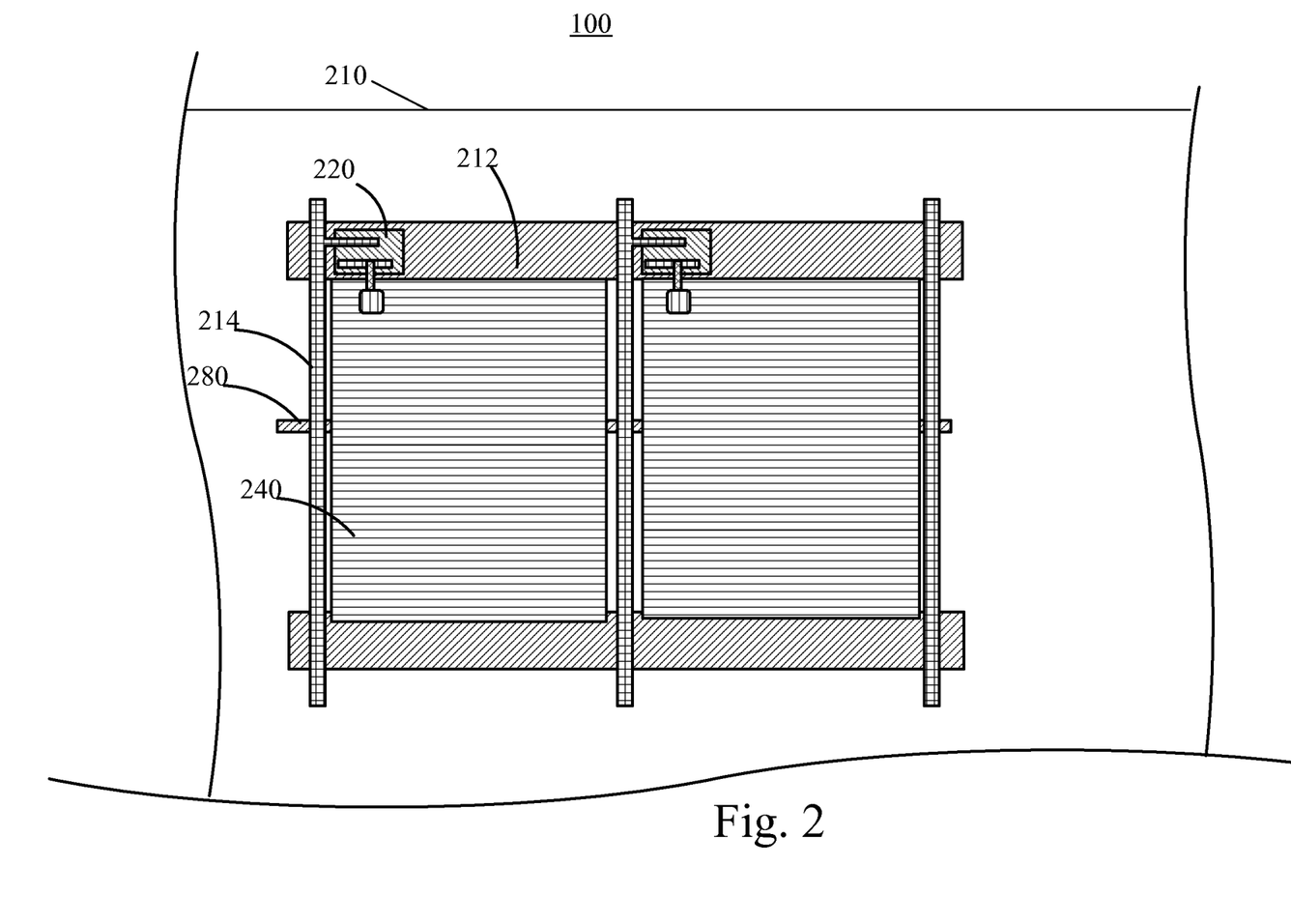
FIG. 2 is a schematic diagram showing an LCD panel according to an embodiment of the present invention.

Referring to FIG. 2, FIG. 2 is a schematic diagram showing an LCD panel 100 according to an embodiment of the present invention. The LCD panel 100 comprises a glass substrate 210, a plurality of scan lines 212, a plurality of data lines 214, a plurality of TFTs 220, a plurality of common electrodes 280, and a plurality of pixel electrodes 240. The plurality of scan lines 212, the plurality of data lines 214, and the plurality of TFTs 220 are disposed on the glass substrate 210. The plurality of scan lines 212 are arranged with the plurality of data lines 214 alternatively, which forms a plurality of pixels arranged complying with a matrix. Each of the plurality of TFTs 220 is electrically connected to a pixel electrode 240, a scan line 212, and a data line 214.

Figure 3:
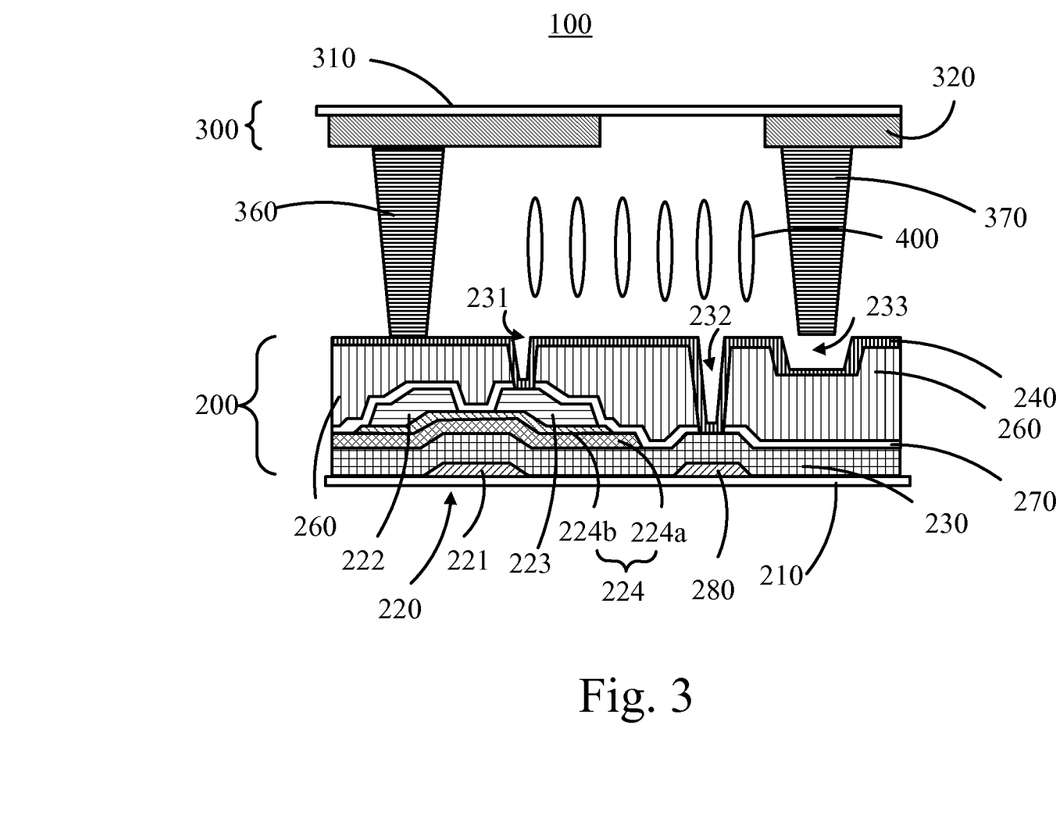
FIG. 3 is a schematic diagram showing the structure of the LCD panel.

Referring to FIG. 2 and FIG. 3, FIG. 3 is a schematic diagram showing the structure of the LCD panel 100. The LCD panel 100 further comprises a COA substrate 200, an opposite substrate 300, and an LC layer 400 between the COA substrate 200 and the opposite substrate 300. The COA substrate 200 further comprises a glass substrate 210 and a plurality of pixel electrodes 240. Each of the plurality of TFTs 220 comprises a gate 221, a source 222, a drain 223, and a semiconductor layer 224. The gate 221 is electrically to a scan line 212; the source 222 is electrically connected to a data line 214; the drain 223 is electrically connected to the pixel electrode 240. The semiconductor layer 224 comprises an a-Si layer 224a used as a passage of the TFT 220 and an ohmic contact layer 224b used for reducing resistance. When the gate 221 of the TFT 220 receives a scan signal transmitted through the scan line 212, the TFT 220 is turned on. A data signal transmitted through the data line 214 is sent to the pixel electrode 240 through the source 222 and the drain 223. The alignment of LC molecules in the LC layer 400 (not shown) is controlled depending on the voltage difference between voltage applied to the data signal and common voltage applied to the common electrode 280. Images having different grayscales are shown on the pixel electrode 240. A color filter 260 is formed on a passivation layer 270 covering the TFT 220. The color filter 260 in each of the plurality of pixels is fabricated from at least one red color filter, one green color filter, and one blue color filter. The color filter 260 covers the TFT 220. A plurality of recesses 233 are randomly disposed on the color filter 260. Moreover, a first via 231 is formed on the drain 223 of the TFT 220, and a second via 232 is formed on the common electrode 280. The pixel electrode 240 is positioned on the color filter 260. In this way, the pixel electrode 240 is also electrically connected to the drain 223 of the TFT 220. A storage capacitor is formed in the overlapping area formed by the common electrode 280 and the pixel electrode 240. The capacitance of the storage capacitor is in inverse proportion to the distance between the common electrode 280 and the pixel electrode 240 and is affected by a dielectric constant of a media between the common electrode 280 and the pixel electrode 240. That's why the second via 232 is formed. The formation of the second via 232, on one hand, is used for shortening the distance between the common electrode 280 and the pixel electrode 240, and on the other hand, is used for reducing the influence of the dielectric constant of the color filter 260 on the capacitance of the storage capacitor.

The pixel electrode 240, such as a transparent electrode, is disposed on the color filter 260 and electrically connected to the corresponding TFT 220. The pixel electrode 240 can also be a reflective electrode or a transflective electrode in other preferred embodiments of the present invention.

The opposite substrate 300 comprises a substrate 310, a black matrix 320, a plurality of main spacers 360, and a plurality of secondary spacers 370. The plurality of main spacers 360 and the plurality of secondary spacers 370 are disposed on the black matrix 320. The black matrix 320 can be optionally formed on the TFT 220, the scan line 212, and on the data line 214 to minimize light leakage from the surroundings of the pixel.

The plurality of main spacers 360 are used for sparing space between the COA substrate 200 and the opposite substrate 300. The distribution of the plurality of main spacers 360 on the opposite substrate 300 is determined depending upon practical demands. For example, each of the plurality of pixels is equipped with a main spacer 360, or every few pixels are equipped with a main spacer 360. In addition, the plurality of secondary spacers 370 are placed besides the plurality of main spacers 360. The plurality of secondary spacers 370 are arbitrarily arranged in areas except areas where the base 330 of each of the plurality of main spacers 360 is located. Or, the plurality of secondary spacers 370 are disposed near the plurality of main spacers 360. Or, the plurality of secondary spacers 370 replace some of the plurality of main spacers 360 and are arranged alternatively with the plurality of main spacers 360. The plurality of secondary spacers 370 are used for sparing space between the COA substrate 200 and the opposite substrate 300 whenever the LCD panel 100 is squeezed by force. The LCD panel 100 comprising the plurality of main spacers and the plurality of secondary spacers forms the LCD panel 100 comprising a plurality of mixed hybrid spacers. The plurality of mixed hybrid spacers are used for enhancing the pressure resistance of the LCD panel 100 and the stability in the assembly process, increasing the elasticity of the LC layer 400 when the LC layer 400 is injected into the space between the COA substrate 200 and the opposite substrate 300. Preferably, the plurality of secondary spacers 370 fit the plurality of recesses 233 while the plurality of secondary spacers 370 do not touch the COA substrate 200. In other words, a distance still exists between the plurality of secondary spacers 370 and the COA substrate 200.

Figure 4:
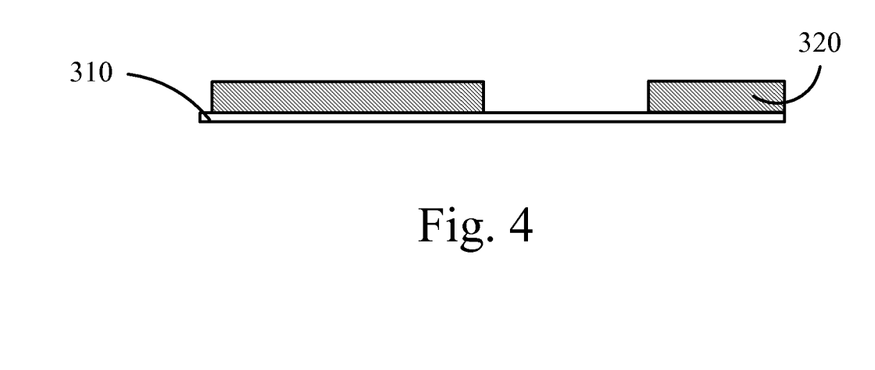
FIGS. 4 and 5 show schematic diagrams of the opposite substrate as shown in FIG. 3.
Figure 5:
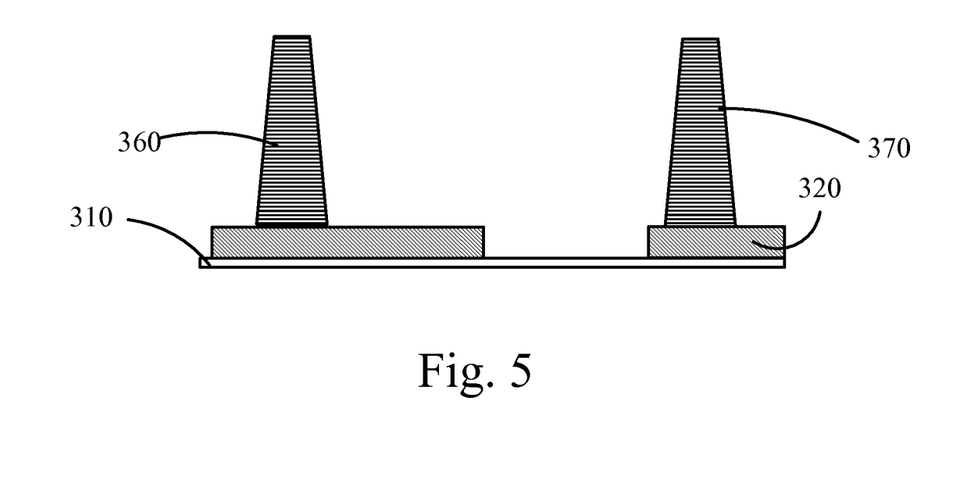
Figure 6:
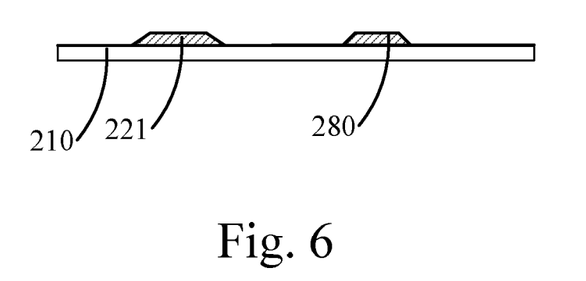
FIGS. 6 through 11 show schematic diagrams of the COA substrate as shown in FIG. 3.
Figure 9:
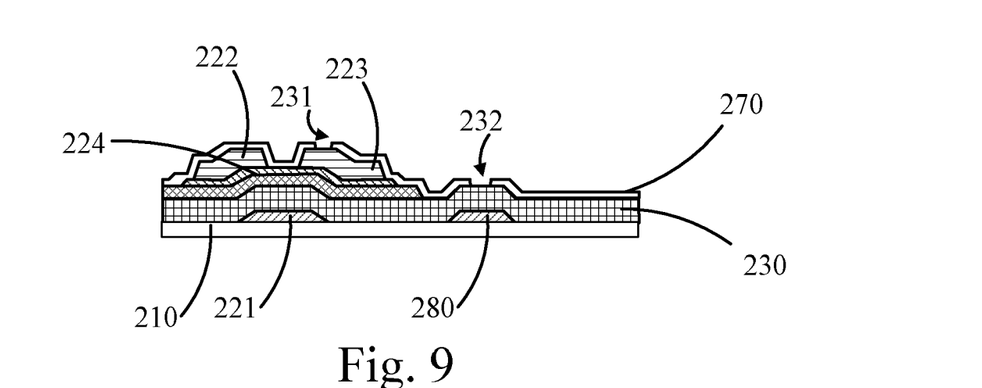
Figure 10:
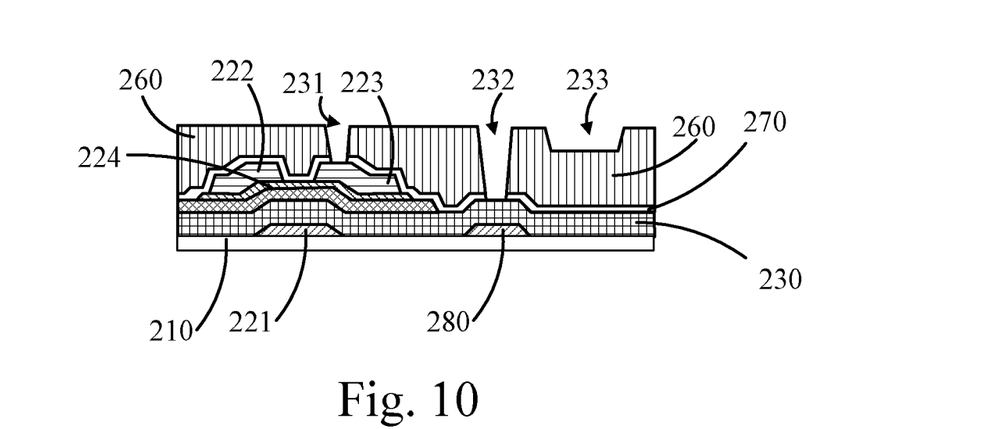
Figure 11:
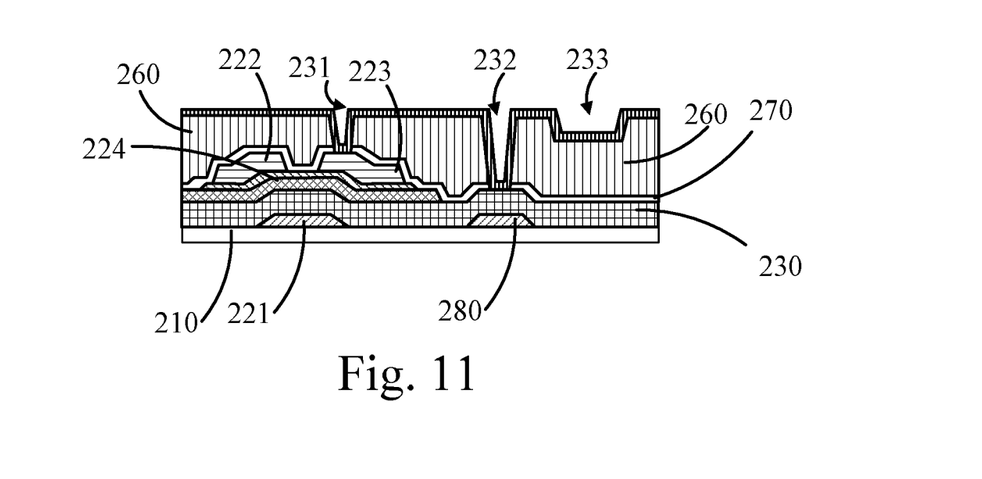

Referring to FIGS. 4 to 11, FIGS. 4 to 11 are schematic diagrams showing the LCD panel 100 of the present invention. FIGS. 4 and 5 show schematic diagrams of the opposite substrate 300 as shown in FIG. 3. FIGS. 6 and 11 show schematic diagrams of the COA substrate 200 as shown in FIG. 3.

Referring to FIG. 4, a substrate 310 is provided. The substrate 310 is a transparent substrate which may be a glass substrate, a plastic substrate, etc. Next, a black matrix 320 is formed on the substrate 310. The black matrix 320 is made of black resin.

Referring to FIG. 5, a photo etching process (PEP) or an inkjet printing process is performed on the substrate 310 to form the plurality of main spacers 360 and the plurality of secondary spacers 370 on the black matrix 320. The plurality of secondary spacers 370 are close to the plurality of main spacers 360. Or, the plurality of secondary spacers 370 replace some of the plurality of main spacers 360 and are arranged with the plurality of main spacers 360 alternatively. So far, the opposite substrate 300 is almost completed.

FIGS. 6 through 11 are schematic diagrams showing the processes of forming the COA substrate 200 as shown in FIG. 3.

Referring to FIG. 6, a glass substrate 210 is provided. A metallic thin-film deposition process is conducted so that a first metallic layer (not shown) is formed on the surface of the glass substrate 210. Meanwhile, a first PEP is conducted using a first mask to form the gate 221 of the TFT 220 and the common electrode 280.

Figure 7:
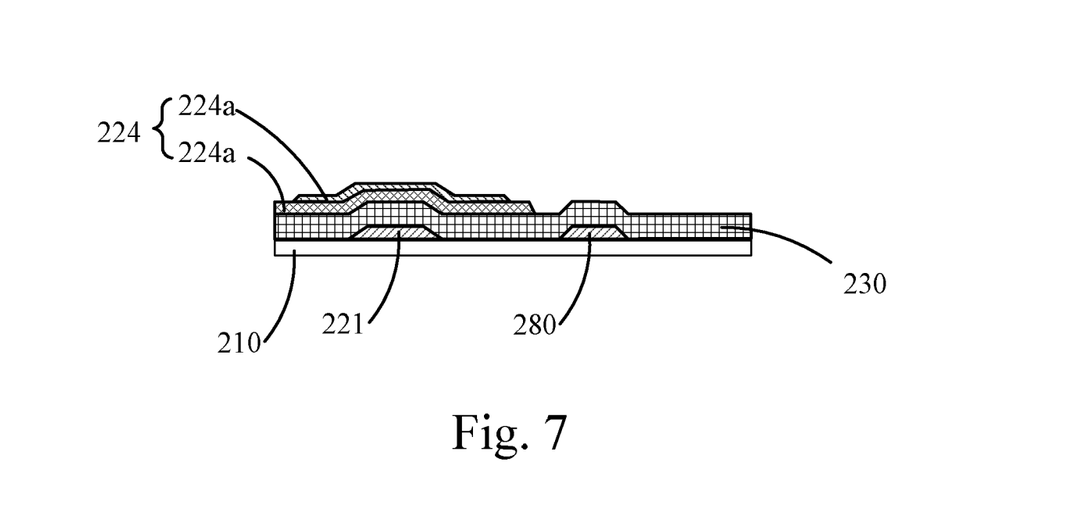

Referring to FIG. 7, an insulating layer 230 made of silicon nitride (SiNx) is deposited and covers the gate 221 and the commin electrode 280. A plurality of amorphous Si (a-Si) layers are successively deposited on the insulating layer 230. An N+a-Si layer at high dopant doping concentrations is deposited on the insulating layer 230 as well. The semiconductor layer 224 is formed after a second PEP is conducted using a second mask. The semiconductor layer 224 comprises the a-Si layer 224a used as a passage of the TFT 220 and the ohmic contact layer 224b used for reducing resistance.

Figure 8:
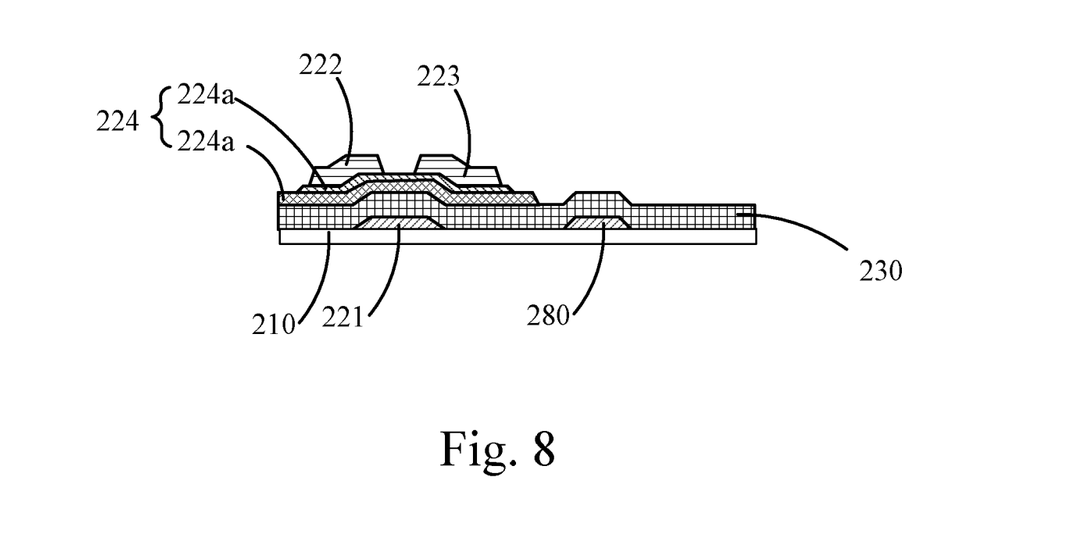

Referring to FIG. 8, a second metallic layer (not shown) is formed on the insulating layer 230 and covers the insulating layer 230 completely. Both of the source 222 and the drain 223 of the TFT 220 are defined after a third PEP is conducted using a third mask. The data line 214 is directly connected to the source 222.

Referring to FIG. 9, the passivation layer 270 made of SiNx is deposited, covering the source 222 and the drain 223. Afterwards, a fourth PEP is conducted using a fourth mask to remove part of the passivation layer 270 on the drain 223 until the surface of the drain 223 is exposed. The first via 231 is formed on the drain 223. Also, part of the passivation layer 270 on the common electrode 280 is etched with the fourth PEP until the surface of the insulating layer 230 is exposed. The second via 232 is formed on the common electrode 280.

Referring to FIG. 10, the color filter 260 is formed on the passivation layer 270. Afterwards, a fifth PEP is conducted using a fifth mask to etch the color filter 260. The color filter 260 in each of the plurality of pixels is fabricated from at least one red color filter, one green color filter, and one blue color filter. It is notified that the plurality of recesses 233 can be randomly formed on the color filter 260 using the fifth PEP.

Referring to FIG. 11, a transparent conducting layer made of indium tin oxide (ITO) or indium zinc oxide (IZO) is formed on the color filter 260. Next, a sixth PEP is conducted using a sixth mask to etch the transparent conducting layer to form the pixel electrode 240. The pixel electrode 240 is electrically connected to the drain 223 of the TFT 220 through the first via 231 formed beforehand. Besides, the distance between the common electrode 280 and the pixel electrode 240 is the smallest near the second via 232. Since the common electrode 280 is separated from the pixel electrode 240 by the passivation layer 270 (not including the color filter 260), the capacitance of the storage capacitor formed by the common electrode 280 and the pixel electrode 240 is higher. Until now, the COA substrate 200 is almost completed.

Referring to FIG. 3, the opposite substrate 300 is disposed on the COA substrate 200, and the LC layer 400 is injected into the space between the opposite substrate 300 and the COA substrate 200. The plurality of secondary spacers 370 fit the plurality of recesses 233. The plurality of main spacers 360 are used for sparing space between the COA substrate 200 and the opposite substrate 300. The plurality of secondary spacers 370 are used for sparing space between the COA substrate 200 comprising the color filter and the opposite substrate 300 whenever the LCD panel 100 is squeezed by force. Between the plurality of secondary spacers 370 and the COA substrate 200 still exists a distance. The LCD panel 100 comprising the plurality of main spacers 360 and the plurality of secondary spacers 370 forms the LCD panel 100 comprising a plurality of mixed hybrid spacers. The plurality of mixed hybrid spacers are used for enhancing the pressure resistance of the LCD panel 100 and the stability in the assembly process, increasing the elasticity of the LC layer 400 when the LC layer 400 is injected into the space between the opposite substrate 300 and the COA substrate 200.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD) panel, comprising a thin-film transistor (TFT) substrate, an opposite substrate, and a liquid crystal (LC) layer sandwiched between the TFT substrate and the opposite substrate, the opposite substrate comprising a plurality of main spacers and a plurality of secondary spacers, the plurality of main spacers used for sparing space between the TFT substrate and the opposite substrate, characterized in that: the TFT substrate comprises:
   a plurality of TFTs;
   a plurality of color filters, disposed on the plurality of TFTs and comprising a plurality of recesses;
   a plurality of pixel electrodes, covering the plurality of color filters, and each of the plurality of pixel electrodes being electrically connected to the corresponding TFT; and
   a black matrix, the plurality of main spacers and the plurality of secondary spacers being disposed on and directly contacting the black matrix;
   wherein the plurality of secondary spacers fit the plurality of recesses, and the plurality of secondary spacers do not touch the TFT substrate.

2. The LCD panel of claim 1, characterized in that: the TFT substrate comprises:
- a glass substrate; and
- a plurality of scan lines and a plurality of data lines disposed on the glass substrate, and each of the plurality of scan lines and each of the plurality of data lines being electrically connected to the corresponding TFT.

3. The LCD panel of claim 2, characterized in that: the TFT substrate further comprises a passivation layer between the plurality of TFTs and the plurality of color filters.

4. The LCD panel of claim 1, characterized in that: the pixel electrode comprises a transparent electrode, a reflective electrode, or a transflective electrode.

5. The LCD panel of claim 1, characterized in that: each color filter is a red color filter, a green color filter, or a blue color filter.

* * * * *